United States Patent

Hiltunen et al.

[11] Patent Number: 6,117,928
[45] Date of Patent: Sep. 12, 2000

[54] POLYLACTIDE FILMS

[75] Inventors: Elina Hiltunen; Johan-Fredrik Selin, both of Helsinki; Maria Skog, Box, all of Finland

[73] Assignee: Neste Oy, Espoo, Finland

[21] Appl. No.: 09/125,867

[22] PCT Filed: Mar. 4, 1997

[86] PCT No.: PCT/FI97/00143

§ 371 Date: Feb. 1, 1999

§ 102(e) Date: Feb. 1, 1999

[87] PCT Pub. No.: WO97/32929

PCT Pub. Date: Sep. 12, 1997

[30] Foreign Application Priority Data

Mar. 5, 1996 [FI] Finland ............................. 961022

[51] Int. Cl.$^7$ ........................................ C08K 5/09
[52] U.S. Cl. ................. 524/284; 524/306; 524/310; 524/315; 524/317; 524/320; 524/321; 524/449; 524/451; 524/442; 524/599; 524/601; 523/124; 528/272; 528/354
[58] Field of Search ..................... 524/284, 306, 524/310, 315, 317, 320, 321, 449, 451, 442, 599, 601; 523/124; 528/272, 354

[56] References Cited

U.S. PATENT DOCUMENTS

| | | | |
|---|---|---|---|
| 3,636,956 | 1/1972 | Schneider et al. | 128/335.5 |
| 5,180,765 | 1/1993 | Sinclair | 524/306 |
| 5,403,897 | 4/1995 | Ebato et al. | 525/444 |

FOREIGN PATENT DOCUMENTS

| | | |
|---|---|---|
| 0523789 | 1/1993 | European Pat. Off. . |
| 523789A1 | 1/1993 | European Pat. Off. . |
| 0683207 | 11/1995 | European Pat. Off. . |
| 683207A2 | 11/1995 | European Pat. Off. . |
| 9407941 | 4/1994 | WIPO . |
| WO9407941 | 4/1994 | WIPO . |
| 9518169 | 7/1995 | WIPO . |
| WO9518169 | 7/1995 | WIPO . |

*Primary Examiner*—Mark L. Warzel
*Attorney, Agent, or Firm*—Birch, Stewart, Kolasch & Birch, LLP

[57] ABSTRACT

The invention relates to polylactide films the mechanical properties of which, in particular bursting strength, elongation and tearing strength, have been improved by adding to the polymer certain plasticizers. These plasticizers are preferably glycerol esters.

9 Claims, No Drawings

POLYLACTIDE FILMS

This application is the national phase under 35 U.S.C. §371 of prior PCT International Application No. PCT/FI97/00143 which has an International filing date of Mar. 4, 1997 which designated the United States of America, the entire contents of which are hereby incorporated by reference.

The invention relates to polylactide films with improved mechanical properties. The invention relates in particular to the use of plasticizers to improve mechanical properties.

Polylactide, i.e. polylactic acid, which is usually prepared from lactic acid dimer, i.e. lactide, has already for years been used for medical purposes, for example in the manufacture of surgical sutures, for degradable bone nails, and for controlled release of drugs. The use of polymers for packaging materials and for other bulk products has so far been limited by the high price of polymers and their susceptibility to breaking down during technical processing. It has not been economically profitable to produce and treat in a manner intended for medical applications a polymer intended for bulk products.

In recent years, interest in biodegradable polymers, i.e. biopolymers, has greatly increased, and many companies have made efforts to launch on the market packaging materials, hygiene products, sacks and films for agricultural purposes, and sacks for waste. In particular, various films have gained importance.

The manufacture of films, in particular film blowing, by no means constitutes simple technology, and so far commercial biopolymers have not been successful in this area. The mechanical and optical properties of film and, for example, its sensitivity to moisture, vary widely.

Polylactides, or condensation polymers which are based on lactic acid, are for many reasons a very attractive group of biopolymers. Their principal degradation product, lactic acid, is a product common in nature, it is not toxic and is used widely in the food and pharmaceutical industries. A high molecular weight polymer can be produced by ring-opening polymerization from lactic acid dimer, lactide. Lactic acid is optically active, and thus its dimer appears in four different forms: L,L-lactide; D,D-lactide; L,D-lactide (mesolactide); and a racemic mixture of L,L- and D,D-lactides. By polymerizing these either as pure compounds or at different blend proportions, polymers are obtained which have different stereochemical structures affecting their resilience and crystallinity and, consequently, also their mechanical and thermal properties. The obtained polymers are usually hard and optically clear, but not as such usable, owing to certain problems.

Upon forming, polylactide is in equilibrium with its monomer, lactide. This has sometimes been deemed to be advantageous, since monomers and oligomers may act as plasticizers of the polymer, but it also leads to rapid hydrolysis and causes problems of adhesion in the processing of the polymer. Furthermore, the presence of the monomer lowers thermal stability during melt processing. In general the residual lactide must be removed from the polymer. An acceptable lactide content is below 2%, preferably below 1%. Various removal methods, such as evaporation, have been disclosed.

The breaking down of polymers during processing can be reduced by the removal of the residual lactide, the maintenance of the water content at a low level (below 200 ppm) or by the addition of commercial stabilizers (WO 94/07941, Cargill). In terms of film blowing, an advantageous method is to mix certain peroxides with the polymer, whereby the melt strength of the polymer will be sufficient for film blowing (FI945964, FI945264, Neste).

Polylactide has excellent optical properties and a high tensile strength, but it is rigid and brittle, and its elongation values are low, as are its tearing strength and bursting strength (dart-drop). Attempts have been made to plasticize the films by using various plasticizers. Battelle's -patent publication WO 92/04493 mentions leaving monomers and oligomers in the polymer for plasticizing purposes. Cargill, WO 94/07941, has used various commercial plasticizers, in particular Citroflex plasticizers manufactured by Morflex, in order to lower the glass transition temperature. However, the results have been modest.

However, in many film products, such as shopping bags and waste bags, bursting strength, elongation and tearing strength are especially important properties. For example, shopping bags must not break even when sharp comers impinge against the film.

It has now been observed, surprisingly, that by using certain types of plasticizers, available even commercially, it is possible to affect not only the glass transition temperature of a polymer but also its elongation and its mechanical properties. In was observed in particular that by using certain plasticizers, or plasticizer/filler combinations, the bursting strength (dart-drop) and the tearing strength could be improved considerably. Usually the elongation at break of untreated polylactide is approx. 2–5%; that of a polylactide according to the invention is at least 200%. The bursting strength in proportion to the film thickness is usually 0.5–1.0 g/$\mu$m, i.e. in practice a weight below 20 g, which is the lowest weight in the standard test, will burst the film. For a film according to the invention, the bursting strength is up to approx. 10–30 g/$\mu$m. As a consequence of these improved properties, the use of polylactide films also for demanding purposes requiring good mechanical properties is facilitated. Bursting strength values of 3–10 g/$\mu$m are sufficient in films subjected to smaller stress, such as bread bags and other bags intended for food packaging, but are not sufficient for, for example shopping bags.

The polylactide used in the invention can be made from L-, D- or D,L-lactide, or blends thereof, by any polymerization process. Copolymers or polymer blends may also be used, but this is by no means necessary for the functioning of the invention. The use of poly-L-lactide is especially advantageous. The weight-average molecular weight ($M_w$) of the polymer according to the invention is approx. 20000–400000, preferably 40000–200000. This corresponds to a number-average molecular weight ($M_n$) of approx. 10000–20000, preferably 10000–100000.

Polylactide films can effectively be tailored according to the intended use by the selection of a suitable plasticizer and, when needed, a filler.

Suitable plasticizers include many commonly available commercial plasticizers, such as mono- and polycarboxylic acid esters, polymeric polyesters, polyalkyl ethers, and glycerol and glycol esters. Blends of various plasticizers can also be used. The suitable plasticizer amounts are 10–30% by weight, preferably 15–20% by weight.

Glycerol esters such as glycerol triacetate and glycerol tripropionate are especially suitable plasticizers. Also various polymeric plasticizers such as adipate derivatives are suitable.

The fillers used may be any conventional inorganic or organic fillers, such as calcium carbonate, kaolin, mica, talc, silica and zeolite. The suitable filler amount may be 0.1–10% by weight, depending on the product. The purpose of the filler is to serve as an adhesion inhibitor and thereby facilitate, for example, the splitting of a tubular film.

When necessary, other conventional additives, such as colorants, can be used. For example, shopping bags are most often white and in that case titanium dioxide can be used for producing a white film.

Plasticizers and, when so desired, fillers and other additives, are mixed with the polylactide, before film blowing, by a conventional melt mixing method, for example in a double-or single-screw extruder or in a batch mixer.

As noted in patent applications FI935964 and FI945264, in polymer stabilization it is possible to use many even commercially available organic peroxy compounds, in particular those from which acids are formed as degradation products. Peroxides acting as stabilizers are characterized by a short half-life, preferably below 10 s, but most preferably below 5 s. Examples which can be given of suitable peroxides include dilauroyl peroxide (half-life at 200° C. 0.057 s), tert-butylperoxydiethylacetate (0.452 s), t-butylperoxy-2-ethylhexanoate (0.278 s), tert-butylperoxyisobutyrate (0.463 s) and tert-butylperoxyacetate (3.9 s), tert-butylperoxybenzoate (4.47 s) and dibenzoylperoxide (0.742 s). The amount of peroxide to be used is approx. 0.05–3% by weight. The required amount depends on the peroxide compound and above all on the desired end product.

The stabilized polymer material can be used for manufacturing films by the blowing method, or the polymer can, of course, be used for manufacturing cast films or sheets, which usually does not set so high requirements on the polymer.

The uses of the films include conventional uses of films, in particular those in which the aim is to minimize the amounts of waste and to process waste by, for example, composting. This involves various packaging materials, such as pouches, films, shopping bags and hygiene products, such as diapers and various agricultural films.

Sheets made from polylactide can be used as various packaging trays or covers or, for example, in agricultural use as cultivation trays or pots.

The invention is described in treater detail with the help of the following examples.

The polylactide used in the experiments was made by ring-opening polymerization from L-lactide with the aid of a stannium octoate catalyst, the molecular weight $M_w$ was approx. 100000–160000. The polylactide was manufactured by Neste Oy.

Before the adding of the plasticizers, residual lactide was removed from the polylactide to a content below 1%, and the polylactide was stabilized with a 0.1% t-butyl peroxybenzoate (Triganox C, manufacturer Akzo Chemie) in accordance with patent application FI945964. The polymer was extruded into a band and was cut into pellets. The pellets were processed, without additional modification or after the modifications described in the examples, into films by using Collin film-blowing equipment. The films were tested by the following standard methods.

Melt index: ASTM D 1238

Tensile strength at break (50 and 500 mm/min): ASTM D 882 (ISO 1184)

Elongation at break (50 and 500 mm/min): ASTM D 882 (ISO 1184)

Tearing strength (Trouser): ASTM D 1938 (ISO 6383/1)

Tearing strength (Elmendorf): ASTM D 1938 (ISO 6383/2)

Bursting strength (Dart drop): ISO 7765-1A

The glass transition temperatures were determined using DSC (Differential Scanning Calorimetry) equipment. In the tensile strength at break and elongation at break tests, the lower speed was used for the more brittle polymers.

EXAMPLE 1

15% by weight of an acetyl-n-butyl citrate plasticizer (Citroflex A-4, manufacturer Morflex) was added to the polymer. The mixing was carried out in a double-screw extruder and the temperature profile used was 25-190-200-190-190-190-195-200° C. A film was made from the obtained pellets by the blowing method. To facilitate the handling of the blown film, talc was also added in an amount of 1% by weight. The polymer became plasticized, the glass transition temperature $T_g$ was 32.2° C., the elongation was 290/270% (MD/TD), and the tensile strength at break remained good, 45/43 MPa. However, the bursting strength was only 52 g for a film 46 μm thick and the tearing strength was 0.65/0.84 N for a film 33/38 μm thick (MD/TD).

EXAMPLE 2

Polyethylene glycol (PEG) is water-soluble, and it is generally regarded as biodegradable. It has also been accepted for food contact (FDA). Commercial PEG grades having different molar mass values were mixed with polylactide in the same manner as in Example 1, and blown films were made from the polymer. The results are shown in Table 1.

TABLE 1

Plasticization of PLLA with polyethylene glycol grades having different molar mass values

| PEG | p-% | $T_g$ ° C. | $MFR_2$ g/10 min | Elongation at break 50 mm/min MD/TD, % | Tensile strength at break MD/TD, MPa |
|---|---|---|---|---|---|
| 600 | 10 | 31 | 6.5–9.5 | 275/310 | 46/39 |
| 1350 | 20 | 38 | 20–30 | 215/270 | 48/23 |
| 2000 | 20 | 41 | 25–35 | 330/360 | 33/28 |
| 4000 | 20 | 38 | 75–80 | 220/340 | 65/25 |
| 8000 | 10 | 37 | 3.5–5.0 | 230/300 | 44/40 |

Polyethylene glycol plasticizes polylactide well. Soft films were also obtained, and the tensile strengths improved considerably. However, after a few days or weeks, PEG began to migrate out of the films, and thus the usability of the plasticizer did not prove to be good.

EXAMPLE 3

Triacetin manufactured by Bayer is glycerol triacetate, and it was used in this example as a plasticizer for polylactide. Triacetin has also been accepted for food contact. Polylactide blends modified with Triacetin plasticizer were prepared and tested. The blends and films were made as described above. The plasticizer amounts and the minerals used, as well as the test results, are shown in Table 3.

TABLE 2

| Triacetin wt. % | Filler | Amount of fillers, wt. % | Elongation at break 50 mm/min MD/TD, % | Tensile strength at break 50 mm/min MD/TD, MPa | Tearing strength (Trousers tear) MD, N/mm |
|---|---|---|---|---|---|
| 10 | — | — | 246/250 | 47/47 | 5.7 |
| 14 | $TiO_2/SiO_2$/Talc | 2/3, 5/3 | 110/140 | 30/15 | 1.9 |
| 15 | $SiO_2$ | 5 | 196/250 | 39/50 | 3.9 |
| 16 | $TiO_2$/Talc | 1.5/2 | 240/270 | 42/36 | 1.3 |
| 20 | $TiO_2/SiO_2$ | 3/5 | — | 49/18 | 100 |

The optiumum properties are dependent on the correct proportions of the plasticizer and the filler

EXAMPLE 4

More polylactide blends modified with Triacetin plasticizer were prepared and tested. The blends were prepared as described above, but the use of various minerals as anti-adhesion agents was in particular optimized in order that tubular blown films could be opened more easily. The amount of Triacetin used was 15% by weight. The results are shown in Table 3.

TABLE 3

Plasticization of PLLA with Triacetin plasticizer by using additionally mineral fillers

| Mineral | Wt. % | Elongation at break 500 mm-/min MD/TD, % | Tensile strength at break 500 mm/min MD/TD, MPa | Film thickness $\mu$m | Bursting strength W (50%) g | Bursting strength-/film thickness g/$\mu$m | Tearing strength (Elmendorf) MD/TD, N |
|---|---|---|---|---|---|---|---|
| Talc | 2 | 241/224 | 48/46 | 48 | 600 | 12.5 | 1.8/3.3 |
| Talc | 5 | 234/231 | 42/43 | 50 | 644 | 12.9 | 4.4/5.3 |
| Talc + TiO$_2$ | 7 + 2 | 221/227 | 44/45 | 54 | 725 | 13.4 | 5.1/6.2 |
| CaCO$_3$ | 2 | 227/236 | 40/46 | 55 | 181 | 3.3 | 1.1/1.4 |
| CaCO$_3$ | 5 | 221/229 | 38/39 | 48 | 715 | 14.9 | 1.4/2.0 |
| CaCO$_3$ + TiO$_2$ | 7 + 2 | 228/225 | 39/40 | 51 | 296 | 5.8 | 2.9/3.9 |

The bursting strengths obtained were very good, even better than for typical film materials polyethylene and polypropylene. According to the reference tests, the bursting strengths for commercial film materials were:

Polyethylene (HDPE). 150 g (film thickness 15 $\mu$m), i.e. 10 g/$\mu$m

LDPE: 60 g (25 $\mu$m), i.e. 2.4 g/$\mu$m and

PP: 128 g (40 $\mu$m), i.e. 3.2 g/$\mu$m.

EXAMPLE 5

Films of Example 3 were investigated, which had been made of a polylactide with which there had been blended 16% Triacetin plasticizer, 2% talc, and 1.5% titanium dioxide (white color). The films were tested above and below the glass transition temperature and at room temperature. The results are shown in Table 4.

TABLE 4

Testing of plasticized PLLA films at different temperatures

| Temperature ° C. | Elongation at break 50 mm/min MD/TD, % | Tensile strength at break 50 mm/min MD/TD, MPa |
|---|---|---|
| 0 | 60/90 | 40/38 |
| 23 | 240/270 | 42/36 |
| 40 | 200/170 | 26/18 |

EXAMPLE 6

In addition to Triacetin plasticizer, also other esters are usable. The next of the glycerol esters tested was glycerol tripropionate. The product used was manufactured by Chemoxy International, under the trade name Tripropionin. The blending with polylactide was carried out in the same manner as in the previous examples. The amounts of plasticizer used were 10 and 15% by weight, talc was added respectively in amounts of 1 and 2% by weight. The results are shown in Table 5.

TABLE 5

| Tripropionin wt. % | Talc wt. % | MFR$_2$ g/10 min | T$_g$ ° C. | Elongation at break 500 mm-/min MD/TD % | Tensile strength at break 500 mm/min MD/TD, MPA | Thickness $\mu$m | Bursting strength W (50%) g | Bursting strength-/film thickness g/$\mu$m |
|---|---|---|---|---|---|---|---|---|
| 10 | 1 | 2.8–3.7 | 42.4 | 9/8 | 36/6 | 50 | <50 | <1 |
| 15 | 2 | 5.6–7.2 | 28.8 | 237/234 | 48/45 | 50 | 600 | 12 |

EXAMPLE 7

Polymeric plasticizers were tested, their advantage being their FDA acceptance for packaging and adhesive application. The products used in the tests were Santicizer products manufactured by Monsanto, which are based on polymeric adipates except Santicizer 160, which is benzyl butyl phthalate. The blending and film making were carried out as previously. The results are shown in Table 6.

TABLE 6

| Santi-cizer | Amount wt. % | Filler | Amount wt. % | Elongation at break MD/TD, % | Tensile strength at break MD/TD MPa | Thickness μm | Bursting strength W (50%) g | Tearing strength N |
|---|---|---|---|---|---|---|---|---|
| 160 | 15 | Talc | 1 | 281/278 | 42/42 | 40 | 33 | 0.39 (E) |
| 160 | 20 | Talc | 2 | 217/252 | 48/42 | 60 | >1000 | |
| 430 | 15 | Talc | 2.5 | 233/240 | 44/48 | 30 | <20 | |
| 431 | 18 | Talc/TiO$_2$ | 2/2 | 246/249 | 47/52 | 30 | 246 | |
| 438 | 15 | — | — | 260/280 | 48/48 | | | 2.7 (T) |
| 438 | 20 | SiO$_2$ | 3 | 250/260 | 44/35 | | | |

(T) Trousers tear, (E) Elmenforf

What is claimed is:

1. Plasticized polylactide films, wherein the bursting strength in proportion to the film thickness is above 5 g/μm measured according to standard ISO 7765-1A and the elongation at break is above 200% measured according to standard ISO 1184.

2. Plasticized films according to claim 1, wherein the polylactide is a stabilized L-polylactide (PPLA) and its monomer content is below 2% by weight.

3. Plasticized films according to claim 1, wherein the polylactide is blended with 10–30% by weight of a plasticizer selected from the group consisting of mono- and polycarboxylic acid esters, polymeric polyesters, polyalkyl ethers, glycerol esters and glycol esters.

4. Plasticized films according to claim 1, wherein the plasticizer is a glycerol ester.

5. Plasticized films according to claim 1, wherein the glycerol ester is glycerol triacetate or glycerol tripropionate.

6. Plasticized films according to claim 1, wherein the plasticizer is a polymeric adipate.

7. Plasticized films according to claim 1, wherein the plasticizer is a blend of two or more plasticizers.

8. Plasticized films according to claim 1, wherein one or several mineral fillers are additionally blended with the polylactide.

9. Plasticized films according to claim 1, wherein the polylactide is blended with 15–20% by weight of a plasticizer selected from the group consisting of mono- and polycarboxylic acid esters, polymeric polyesters, polyalkyl ethers, glycerol esters and glycol esters.

* * * * *